(No Model.)

J. H. E. DE CELLES.
EXTENSION TEMPLE OR BOW FOR TESTING FRAMES.

No. 532,446. Patented Jan. 15, 1895.

Witnesses
Chas. F. Schmelz
Katie Farrell

Inventor
Joseph H. E. De Celles,
By Attorney
John C. Dewey.

UNITED STATES PATENT OFFICE.

JOSEPH H. E. DE CELLES, OF SOUTHBRIDGE, MASSACHUSETTS.

EXTENSION TEMPLE OR BOW FOR TESTING-FRAMES.

SPECIFICATION forming part of Letters Patent No. 532,446, dated January 15, 1895.

Application filed January 16, 1894. Serial No. 497,029. (No model.)

*To all whom it may concern:*

Be it known that I, JOSEPH H. E. DE CELLES, a citizen of the United States, residing at Southbridge, in the county of Worcester and State of Massachusetts, have invented certain new and useful Improvements in Extension Temples or Bows for Testing-Frames; and I do hereby declare that the following is a full, clear, and exact description thereof, which, in connection with the drawings making a part of this specification, will enable others skilled in the art to which my invention belongs to make and use the same.

My invention relates to an extension temple or bow, and the object of my invention is to provide an extension temple or bow adapted to be extended and contracted in length, by adjusting the two parts forming the same, upon each other; said two parts being moved lengthwise and held in their extended or contracted position by a nut mounted thereon, as will be hereinafter described.

My invention consists in certain novel features of construction of a temple or bow of the description above given.

Figure 1:
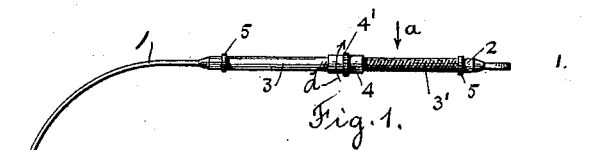
Figure 2:
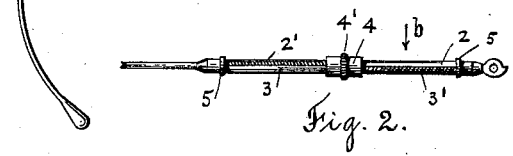
Figure 3:
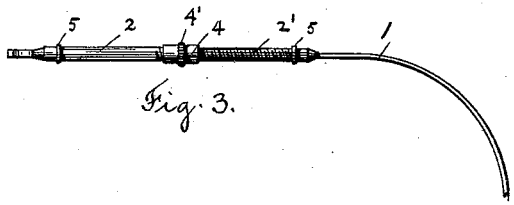
Figure 4:
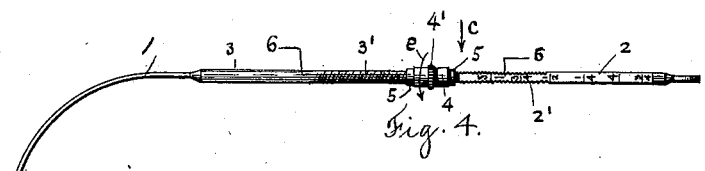
Figure 5:
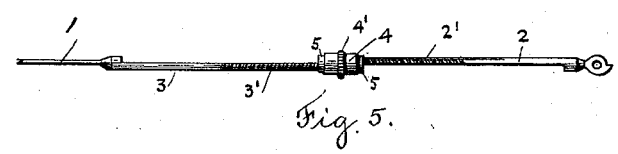
Figure 6:
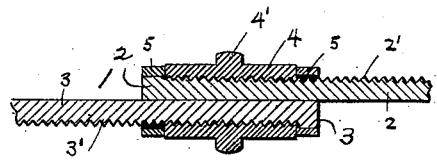

Referring to the drawings:—Figure 1 is a side view of a temple or bow showing my improvement in its contracted position. Fig. 2 is a plan view, looking in the direction of arrow *a*, Fig. 1. Fig. 3 is an opposite side view of the temple or bow shown in Fig. 1, looking in the direction of arrow *b*, Fig. 2. Fig. 4 corresponds to Fig. 1, but shows the temple or bow fully extended. Fig. 5 is a plan view of the extended temple or bow shown in Fig. 4, looking in the direction of arrow *c*, same figure, and Fig. 6 is, on an enlarged scale, a central longitudinal section, taken on line 6, 6, Fig. 4.

In the accompanying drawings, 1 represents a temple or bow of an oculist's trial frame, embodying my improvement.

My improved temple or bow consists of the two parts 2, and 3, which have a circular exterior, and are preferably of semi circular shape in cross section, with the adjoining flat surfaces adapted to slide on each other. On the circular portion of one rod, as 2, a right-hand thread 2' is cut, and on the circular portion of the other rod, as 3, a left-hand thread 3' is cut. A nut 4 made in one part is tapped out with a right-hand thread, and then tapped out with a left-hand thread, so that the threads in said nut are both right and left. Said nut 4 is then run on to the threaded portions 2' and 3' of the two parts 2 and 3 of the temple or bow.

By turning the nut 4 in one direction, as indicated by arrow *d*, Fig. 1, to extend the bow, the left-hand thread in said nut 4 will engage and turn on the left-hand thread 3' on the part 3, and cause said nut to move to the right, away from the bowed end, as shown in Fig. 4. At the same time the right-hand thread in said nut 4 will engage the right-hand thread 2' on the part 2, and communicate motion to said part 2, to cause it to slide on the part 3, twice as fast as the nut 4 travels, or double the distance that said nut travels, to extend the bow as shown in Figs. 4 and 5.

After the bow has been extended, by turning the nut 4, as above described, it may be contracted by turning said nut 4 in the opposite direction, indicated by arrow *e*, Fig. 4, to cause said nut to move to the left on the thread 3' on the part 3, and at the same time to cause the part 2 to move to the left, so that the parts 2 and 3 will be moved on each other, to shorten the bow, as shown in Fig. 1.

The threaded end of each part 2 and 3 is preferably provided with a collar 5 secured thereto, which collar loosely encircles the circular part of the opposite part, to hold the two parts together at their ends.

The flat surface of one of the parts, as 2, may be marked or graduated, as shown in Fig. 4, to give the length of the bow, when partially or fully extended, in inches, or fractions of inches. The nut 4 is preferably provided with a knurled flange 4', encircling the same, to furnish means for readily turning said nut.

The advantages of my improved extension bow will be readily appreciated by those skilled in the art.

Having thus described my invention, what I claim as new, and desire to secure by Letters Patent, is—

1. A temple or bow for oculists' testing frames consisting of two parts adapted to be moved longitudinally upon each other, the contacting portions being each semi-cylindrical in cross-section and provided with screw threads upon its outer surface, the threads upon one of the parts being right hand and those upon the other being left hand, and the flat surface of one of the parts being provided with gradations for indicating the length of the bow when extended, a ring secured to the end of each contacting portion and adapted to slide loosely upon the other portion for holding the flat surfaces together, a double threaded nut upon the parts between the rings, the central portion of which is provided with a milled projection, the opposite end of one of the parts being provided with means for holding it to the frame with the graduated flat surface outward, and the opposite end of the other part being provided with means for holding it upon the head of the person, substantially as set forth.

2. A temple or bow for oculists' testing frames consisting of two parts adapted to be moved longitudinally upon each other, the contacting portions of said parts being each semi-cylindrical in cross-section and provided with screw threads upon its outer surface, the threads upon one of the parts being right hand and those upon the other being left hand, a ring secured to one end of each of the contacting portions and adapted to slide loosely upon the other portion for holding the flat surfaces together, a double threaded nut upon the parts between the rings, the opposite end of one of the parts being provided with means for holding it to the frame and the opposite end of the other part being provided with means for holding it upon the head of the person, substantially as set forth.

JOSEPH H. E. DE CELLES.

Witnesses:
GEO. W. WELLS,
CHANNING M. WELLS.